US009383019B2

(12) United States Patent
Takahashi

(10) Patent No.: US 9,383,019 B2
(45) Date of Patent: Jul. 5, 2016

(54) MECHANICAL SEAL

(71) Applicant: EagleBurgmann Japan Co., Ltd., Tokyo (JP)

(72) Inventor: Hidekazu Takahashi, Tokyo (JP)

(73) Assignee: EagleBurgmann Japan Co., Ltd., Tokyo (JP)

( * ) Notice: Subject to any disclaimer, the term of this patent is extended or adjusted under 35 U.S.C. 154(b) by 0 days.

(21) Appl. No.: 14/650,000

(22) PCT Filed: Mar. 27, 2014

(86) PCT No.: PCT/JP2014/058833
§ 371 (c)(1),
(2) Date: Jun. 5, 2015

(87) PCT Pub. No.: WO2014/168013
PCT Pub. Date: Oct. 16, 2014

(65) Prior Publication Data
US 2015/0316153 A1 Nov. 5, 2015

(30) Foreign Application Priority Data
Apr. 8, 2013 (JP) .................................. 2013-080684

(51) Int. Cl.
*F16J 15/34* (2006.01)
(52) U.S. Cl.
CPC .......... *F16J 15/3488* (2013.01); *F16J 15/3452* (2013.01)
(58) Field of Classification Search
CPC ........................... F16J 15/3488; F16J 15/3452
See application file for complete search history.

(56) References Cited

U.S. PATENT DOCUMENTS

| 5,913,521 A * | 6/1999 | Sangren ............... F16J 15/3488 277/370 |
| 8,448,950 B2 * | 5/2013 | Sato ..................... F16J 15/3488 277/358 |
| 2003/0102631 A1 | 6/2003 | Takahashi |
| 2005/0087931 A1 * | 4/2005 | Yamauchi ............ F16J 15/3488 277/358 |
| 2010/0090409 A1 * | 4/2010 | Sridhar .................... F16J 15/18 277/308 |

FOREIGN PATENT DOCUMENTS

| CN | 201443591 U | 4/2010 |
| JP | 08-054067 A1 | 2/1996 |
| JP | 2003-166651 A1 | 6/2003 |
| JP | 2005-140258 A1 | 6/2005 |

(Continued)

OTHER PUBLICATIONS

International Search Report (Application No. PCT/JP2014/058833) dated May 27, 2014.

(Continued)

*Primary Examiner* — Gilbert Lee
*Assistant Examiner* — Thomas Neubauer
(74) *Attorney, Agent, or Firm* — Burr & Brown, PLLC

(57) ABSTRACT

Provided is a mechanical seal that has an improved accuracy of positioning a plurality of divided bodies that compose a seal ring. A mechanical seal for sealing an annular gap between a rotary shaft and a housing, comprising: a divided-type seal ring that is an annular seal ring composed by combining a plurality of divided bodies; is characterized by comprising metallic bands that fix the plurality of divided bodies by clamping outer peripheral surfaces of the plurality of divided bodies.

7 Claims, 5 Drawing Sheets

(56) References Cited

FOREIGN PATENT DOCUMENTS

| JP | 2013-011325 | * | 1/2013 | ............... F16J 15/36 |
| JP | 2013-011325 | A1 | 1/2013 | |

OTHER PUBLICATIONS

Chinese Office Action (with partial English translation), Chinese Application No. 201480003324.9, dated Feb. 24, 2016 (8 pages).

* cited by examiner

MECHANICAL SEAL

BACKGROUND OF THE INVENTION

1. Field of the Invention

The present invention relates to a mechanical seal that includes a divided-type seal ring.

2. Description of Related Art

In a mechanical seal, there is known a technique in which, with the objective of mountability, a seal ring is divided and an annular seal ring is composed by combining the divided bodies at the time of mounting the mechanical seal to a mounting position. In many cases, the seal ring in the mechanical seal is formed of ceramics (plastic material) such as SiC or alumina. In those cases, it is not possible to fix the divided bodies together with a fastener such as a bolt. Accordingly, a structure is adopted in which the plurality of divided bodies are positioned and fixed by clamping the outer peripheral surfaces thereof by a clamping ring when the plurality of divided bodies are in a state in which they are being combined (see Patent Literature 1).

However, as to the structure in which the plurality of divided bodies are fixed by a clamping ring, there is a problem that such structure may become complex or too large.

CITATION LIST

Patent Literature

Patent Literature 1: Japanese Patent Application Laid-open No. 2003-166651

SUMMARY OF INVENTION

Technical Problem

An object of the present invention is to provide a mechanical seal that enables simplification and size reduction of a structure for fixing a plurality of divided bodies that compose a seal ring.

Solution to Problem

The present invention has adopted the following means in order to solve the above problem.

That is, the mechanical seal of the present invention is a mechanical seal for sealing an annular gap between a rotary shaft and a housing, comprising: a divided-type seal ring that is an annular seal ring composed by combining a plurality of divided bodies; characterized in that the mechanical seal comprises a metallic band that fixes the plurality of divided bodies by clamping outer peripheral surfaces of the plurality of divided bodies.

According to the present invention, by clamping the outer peripheral surfaces of the plurality of divided bodies with the metallic band, the plurality of divided bodies are fixed. Thus, as compared with a structure in which the plurality of divided bodies are fixed by a clamping ring, it becomes possible to simplify the structure and reduce the size of the structure. In addition, it is possible to clamp the outer peripheral surfaces of the plurality of divided bodies over an entire circumference with a substantially uniform clamping force.

It is preferable that, on the seal ring, a spring hole is formed to which a spring that urges the seal ring in an axial direction is attached.

Accordingly, as compared with a case where a spring hole is provided on the clamping ring in the conventional structure in which the plurality of divided bodies are fixed by the clamping ring, it is possible to reduce the size of the structure.

It is preferable that, on the seal ring, an engaged portion is formed that is engaged by a detent portion provided on a rotary shaft side or a housing side.

Accordingly, as compared with the case where an engaged portion is provided on the clamping ring in the conventional structure in which the plurality of divided bodies are fixed by the clamping ring, it is possible to reduce the size of the structure.

It is preferable that an annular groove is formed on an outer periphery of the seal ring, the mechanical seal further comprises an annular member that positions the plurality of divided bodies relative to each other in an axial direction by being fitted in the annular groove, the plurality of divided bodies are fixed by clamping the outer peripheral surfaces of the plurality of divided bodies by the metallic band when the plurality of divided bodies are in a state in which the plurality of divided bodies are positioned relative to each other in the axial direction by the annular member.

Accordingly, by fitting the annular member in the annular groove formed on the outer periphery of the seal ring, the plurality of divided bodies are positioned relative to each other in the axial direction. Then, when the plurality of divided bodies are in this state, by clamping the outer peripheral surfaces of the plurality of divided bodies with the metallic band, the plurality of divided bodies are fixed. Accordingly, it becomes possible to perform the positioning of the plurality of divided bodies in the axial direction and the positioning of the plurality of divided bodies in a radial direction with improved accuracy.

It is preferable that, on the annular member, a spring hole is formed to which a spring that urges the seal ring in the axial direction is attached.

Accordingly, it is possible to provide a function for positioning the plurality of divided bodies in the axial direction and a function for supporting the spring to the annular member.

Advantageous Effects of Invention

As described, according to the present invention, it is possible to achieve the simplification and the size reduction of the structure for fixing a plurality of divided bodies that compose the seal ring.

DETAILED DESCRIPTION OF THE INVENTION

Hereinafter, modes for carrying out the present invention will be exemplarily described in detail based on examples thereof with reference to the drawings. However, the dimensions, materials, shapes, relative arrangements and so on of constituent parts described in the examples are not intended to limit the scope of the present invention to these alone in particular unless specifically described.

First Example

With reference to FIGS. 1 to 4, a mechanical seal according to a first example of the present invention will be described.

Mechanical Seal

Figure 1:
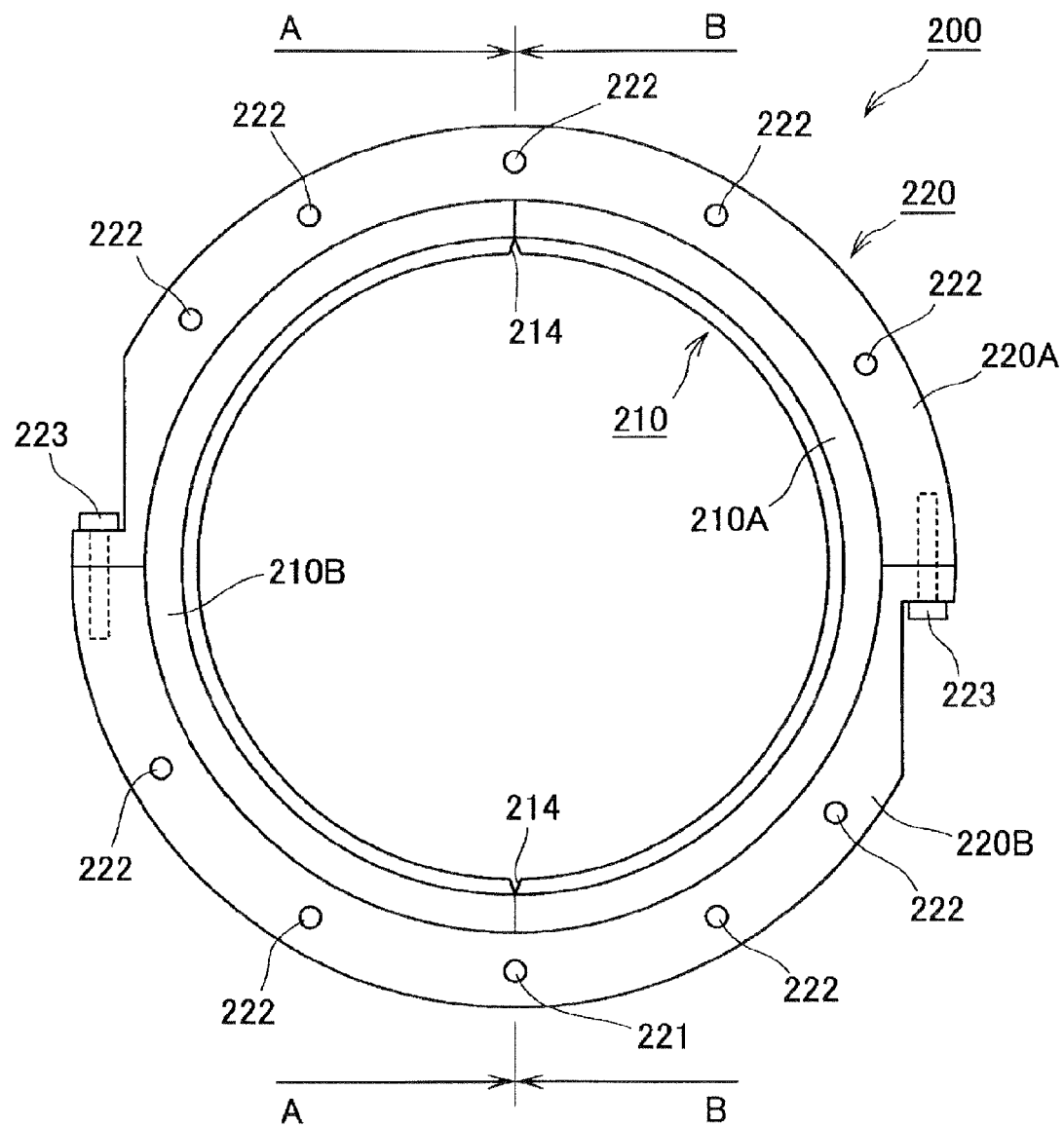
FIG. 1 is a plan view showing the principal components of a mechanical seal (a seal ring and an annular member) according to a first example of the present invention.
Figure 2:
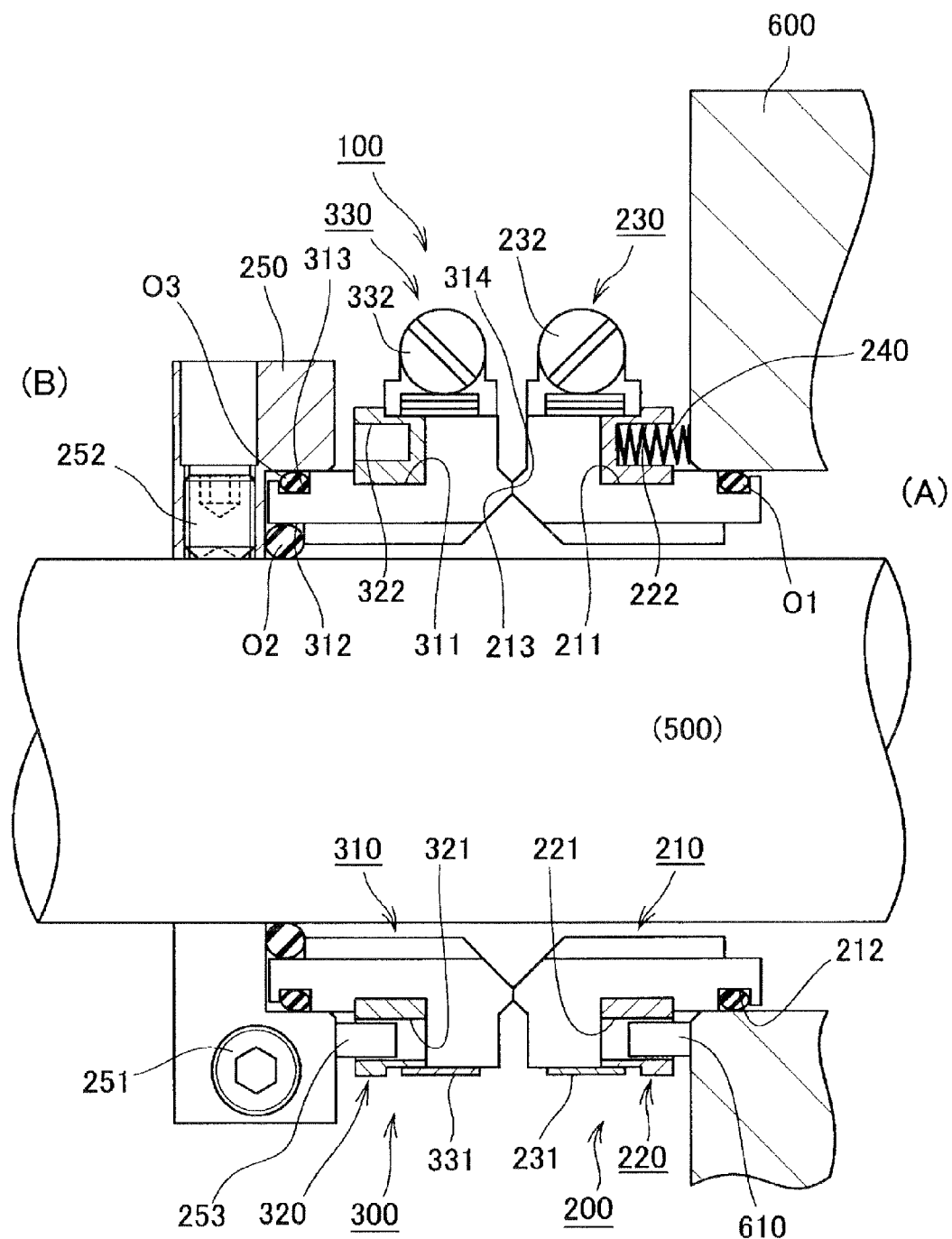
FIG. 2 is a schematic cross-sectional view showing a mounted state of the mechanical seal according to the first example of the present invention.
Figure 3:
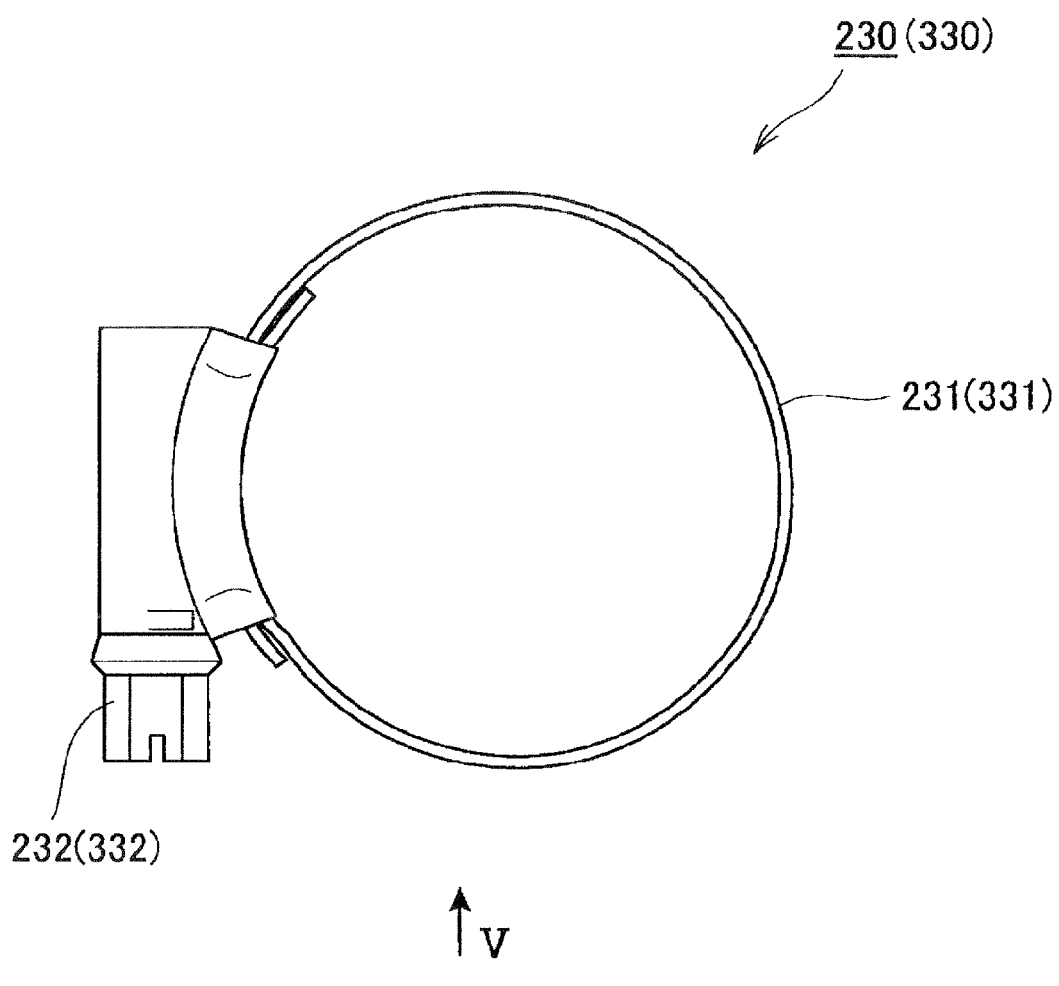
FIG. 3 is a side view of a hose band.
Figure 4:
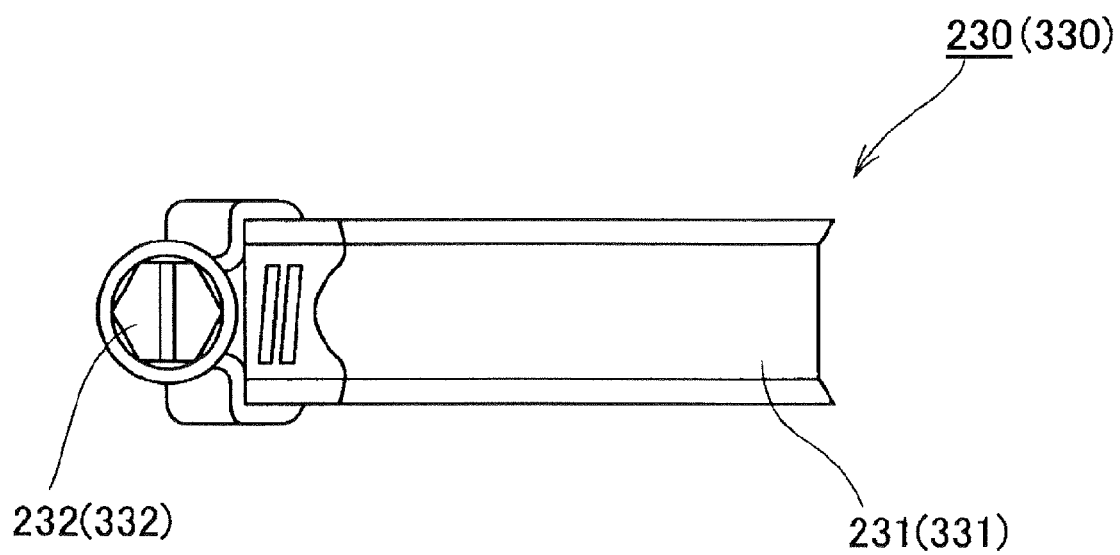
FIG. 4 is a front view of the hose band.

The overall configuration of the mechanical seal according to the first example of the present invention will be described. FIG. 1 is a plan view showing a seal ring and an annular member as the principal components of the mechanical seal according to the first example of the present invention. FIG. 2 is a schematic cross-sectional view showing a mounted state of the mechanical seal according to the first example of the present invention. Note that the mechanical seal in FIG. 2 shows a cross section intersected by a plane including the central axis line of the axis of rotation. In addition, FIG. 3 is a side view of a hose band, and FIG. 4 is a front view of the hose band. Note that FIG. 4 is a view when the hose band in FIG. 3 is viewed in a direction of arrow V.

A mechanical seal 100 according to the present example is an outside seal that includes a stationary ring unit 200 and a rotary ring unit 300, and plays a role to seal an annular gap between a rotary shaft 500 and a housing 600. That is, the mechanical seal 100 is used to prevent a sealed liquid of a sealed liquid side (A), that is sealed in the annular gap between the rotary shaft 500 and the housing 600, from leaking from an inner peripheral side to an outer peripheral side (B). The mechanical seal 100 according to the present example is a stationary-type seal, thus actuating portions such as a spring 240 are provided on the stationary ring unit 200 side.

The stationary ring unit 200 includes a stationary ring 210 as an annular seal ring, an annular member 220 that positions a plurality of divided bodies composing the stationary ring 210 (hereinafter referred to as divided bodies 210A and 210B, as appropriate) relative to each other in an axial direction, and a hose band 230 as a fixing member for fixing the plurality of divided bodies 210A and 210B by clamping the outer peripheral surfaces of the plurality of divided bodies 210A and 210B. Here, the hose band 230 is a band used for fixing a hose to a tap or the like, and is also called a hose clip. Note that the "axial direction" denotes the axial direction of the rotary shaft 500. The same shall apply hereafter.

Note that, in FIG. 1, the plan view of the stationary ring 210 and the annular member 220 of the stationary ring unit 200 is shown. FIG. 1 corresponds to the drawing when the stationary ring 210 and the annular member 220 are viewed in the axial direction from the right side in FIG. 2. In addition, the stationary ring 210 and the annular member 220 in FIG. 2 correspond to an AA cross-sectional view in FIG. 1.

The stationary ring unit 200 configured as above is mounted to the housing 600. That is, by inserting a pin 610 attached to an end surface of the housing 600 into a through hole 221 provided on the annular member 220, the stationary ring unit 200 is mounted to the housing 600. Note that an annular groove 212 is formed on the outer peripheral side of the stationary ring 210. By fitting an O ring O1 in the annular groove 212, an annular gap between an inner peripheral surface of the housing 600 and an outer peripheral surface of the stationary ring 210 is sealed.

On the annular member 220, a plurality of spring holes 222 are provided to which the springs 240 are attached, and to each of the plurality of spring holes 222, the spring 240 is attached. Accordingly, the stationary ring unit 200 is urged towards the rotary ring unit 300 side. That is, with respect to the housing 600, the stationary ring unit 200 is constrained by a pin 610 so as not to move in a rotation direction, but is configured to be movable in the axial direction. Note that, though not shown in the drawing, the annular member 220 is also provided with a pin that engages with a hole or a notch formed on the stationary ring 210, and thus the stationary ring 210 is configured so as not to move in the rotation direction with respect to the annular member 220.

The rotary ring unit 300 also includes a rotary ring 310 as an annular seal ring, an annular member 320 that positions a plurality of divided bodies composing the rotary ring 310 relative to each other in the axial direction, and a hose band 330 as a fixing member for fixing the plurality of divided bodies by clamping the outer peripheral surfaces of the plurality of divided bodies.

Here, in the present example, the stationary ring 210, the annular member 220, and the hose band 230 that constitute the stationary ring unit 200, and the rotary ring 310, the annular member 320, and the hose band 330 that constitute the rotary ring unit 300 are composed of the same components, respectively. Therefore, the plan view shown in FIG. 1 is the same as a plan view of the rotary ring unit 300. That is, FIG. 1 corresponds to the drawing when the rotary ring 310 and the annular member 320 are viewed in the axial direction from the left side in FIG. 2. In addition, the rotary ring 310 and the annular member 320 in FIG. 2 correspond to a BB cross-sectional view in FIG. 1.

The rotary ring unit 300 configured as above is mounted to the rotary shaft 500. That is, by inserting a pin 253 attached to a collar 250 fixed to the rotary ring 500 into a through hole 321 provided on the annular member 320, the rotary ring unit 300 is mounted to the rotary shaft 500. That is, the rotary ring unit 300 is constrained by the pin 253 so as not to move in the rotation direction with respect to the collar 250. Note that, though not shown in the drawing, the annular member 320 is also provided with a pin that engages with a hole and a notch formed on the rotary ring 310, and thus the rotary ring 310 is configured so as not to move in the rotation direction with respect to the annular member 320.

Note that a stepped portion 312 is formed on the inner peripheral side of the rotary ring 310, and by attaching an O ring O2 to the stepped portion 312, an annular gap between the outer peripheral surface of the rotary shaft 500 and the inner peripheral surface of the rotary ring 310 is sealed. In addition, an annular groove 313 is formed on the outer peripheral side of the rotary ring 310, and by fitting an O ring O3 in the annular groove 313, an annular gap between the inner peripheral surface of the collar 250 and the outer peripheral surface of the rotary ring 310 is sealed. The collar 250 is also composed of two divided bodies, and the two divided bodies are fixed by a bolt 251. Accordingly, the annular collar 250 is composed by fixing the divided bodies together. In addition, the collar 250 is fixed to the rotary shaft 500 by a set screw 252.

As described above, since the stationary ring unit 200 is urged towards the rotary ring unit 300 side by the plurality of springs 240, a seal end surface 213 of the stationary ring 210 and a seal end surface 314 of the rotary ring 310 will not be spaced apart. Note that both the seal end surface 213 of the stationary ring 210 and the seal end surface 314 of the rotary ring 310 are configured so as to be tapered towards the tip thereof.

According to the mechanical seal 100 configured as above, the rotary ring unit 300 rotates with the rotation of the rotary shaft 500, and the seal end surface 314 of the rotary ring 310 and the seal end surface 213 of the stationary ring 210 slide against each other while making intimate contact with each other. Therefore, it is possible to prevent the leakage of the sealed liquid to the outer peripheral side (B).

Constituent Members of Mechanical Seal

Members that constitute the mechanical seal 100 will be described in greater detail. Both the seal rings (the stationary ring 210 and the rotary ring 310) and the annular members (the annular members 220 and 230) that constitute the mechanical seal 100 have, with the objective of mountability (necessity), a two-piece structure in which an annularly-shaped member is formed by combining two divided bodies. That is, the mechanical seal 100 according to the present example adopts a divided-type seal ring that is an annular seal ring composed by combining a plurality of divided bodies.

In addition, the stationary ring unit 200 and the rotary ring unit 300 have the same basic configuration. As described above, in the present example, the stationary ring 210, the annular member 220, and the hose band 230 that constitute the stationary ring unit 200, and the rotary ring 310, the annular member 320, and the hose band 330 that constitute the rotary ring unit 300 are composed of the same components, respectively. However, since the mechanical seal 100 according to the present example is a stationary-type seal, the spring 240 is attached to each of the plurality of spring holes 222 provided on the annular member 220 on the stationary ring unit 200 side. On the other hand, a plurality of spring holes 322 provided on the annular member 320 on the rotary ring 310 side are left vacant. As shown in FIGS. 3 and 4, the hose bands 230, 330 include metallic bands 231, 331 and tightening bolts 232, 332 that tighten the metallic bands 231, 331. As the hose band (also referred to as the hose clip as described above) is a well-known technique, the detailed description thereof will be omitted, except that the hose band is configured so as to be able to tighten or loosen the metallic band by tightening or loosening the bolt.

With the foregoing, in the following description, only the constituent components on the stationary ring unit 200 side will be described in detail in order to make the description simple.

The stationary ring 210 is formed of ceramics (plastic material) such as SiC or alumina. The stationary ring 210 is composed of the two divided bodies 210A and 210B that are obtained by dividing an annular member by, for example, pulling. In the present example, in order to facilitate the dividing of the annular member into two, two notches 214 are provided on the inner peripheral side (see FIG. 1). Accordingly, by pulling the annular member in left and right directions in FIG. 1, those portions provided with the notches 214 split, and the two divided bodies 210A and 210B can be obtained. An annular groove 211 is formed on the outer periphery of the stationary ring 210 that is composed by combining the two divided bodies 210A and 210B. Note that the rotary ring 310 has the same configuration and an annular groove 311 is formed on its outer periphery.

The annular member 220 is a metallic or resinous member, and the annular member is composed by combining two divided bodies (hereinafter referred to as divided bodies 220A and 220B, as appropriate). The divided bodies 220A and 220B are fixed together by bolts 223. In addition, as described above, the through hole 221 into which the pin 610 is inserted and, on the annular member 220, the plurality of spring holes 222 are provided to which the springs 240 are attached. The annular member 320 also has the same configuration.

When assembling the stationary ring unit 200, firstly, the annular stationary ring 210 is formed by combining the two divided bodies 210A and 210B. Then, the divided bodies 220A and 220B that compose the annular member 220 are fitted in the annular groove 211 formed on the stationary ring 210. At this point, it is preferable that the divided surfaces of the divided bodies 210A and 210B composing the stationary ring 210, and the divided surfaces of the divided bodies 220A and 220B composing the annular member 220 are displaced by 90 degrees. Then, the divided body 220A and the divided body 220B are fixed by the bolts 223. Here, the groove width of the annular groove 211 formed on the stationary ring 210 and the width of the annular member 220 (a length in the axial direction) are designed to have the same dimension. Accordingly, by fitting the annular member 220 in the annular groove 211 formed on the stationary ring 210, the positioning of the divided bodies 210A and 210B composing the stationary ring 210 in the axial direction is performed.

As described, the outer peripheral surfaces of the divided body 210A and the divided body 210B are clamped by the hose band 230, when the divided body 210A and the divided body 210B are in a state in which they are positioned in the axial direction by the annular member 220. Accordingly, the divided body 210A and the divided body 210B are fixed. Note that, by clamping the outer peripheral surface of the stationary ring 210 composed of the divided body 210A and the divided body 210B by tightening the clamp bolt 232 on the hose band 230, it is possible to clamp the outer peripheral surface of the stationary ring 210 over its entire circumference with a substantially uniform clamping force.

Here, the outer diameter of the outer peripheral surface of the portion of the stationary ring 210 that is clamped by the hose band 230 is designed to be larger than the outer diameter of the portion of the annular member 220 with which the metallic band 231 of the hose band 230 makes contact. Therefore, the clamping force from the metallic band 231 is prevented from acting on the annular member 220. That is, the clamping force of the metallic band 231 is designed to act only on the stationary ring 210. Note that the assembly of the rotary ring unit 300 is the same as the assembly of the stationary ring unit 200.

Note that, in the present example, since the mechanical seal 100 is an outside seal, various members constituting the mechanical seal 100 are exposed to the atmosphere side. Accordingly, mounting (assembling) of the mechanical seal 100 is easy.

Advantages of the Mechanical Seal According to the Present Example

According to the mechanical seal 100 of the present example, by clamping the outer peripheral surfaces of the plurality of divided bodies with the metallic band, the plurality of divided bodies are fixed. That is, as for the stationary ring unit 200, by clamping the outer peripheral surfaces of the plurality of divided bodies 210A and 210B with the metallic band 231, the plurality of divided bodies 210A and 210B are fixed. The same applies to the rotary ring unit 300. Thus, as compared with a structure in which the plurality of divided bodies are fixed by a clamping ring, it becomes possible to simplify the structure and reduce the size of the structure. In addition, there is also an advantage that, by fixing with the metallic bands 231 and 331, it is possible to clamp the outer peripheral surface of the stationary ring 210 and the outer peripheral surface of the rotary ring 310 over the entire circumferences with a substantially uniform clamping force. Consequently, sealing performance is also enhanced. Note that a typical clamping ring is composed of two members that form an annular shape when combined and bolts for fixing those two members. In a case of the clamping ring configured like this, a clamping force acting on a position, and its vicinity, displaced 90 degrees from a position of tightening is maximized so that the clamping force does not become uniform in a circumferential direction. Consequently, sealing performance may be degraded.

In addition, according to the mechanical seal 100 of the present example, by fitting the annular member in the annular groove formed on the outer periphery of the seal ring, the plurality of divided bodies are positioned relative to each other in the axial direction. That is, in the stationary ring unit 200, by fitting the annular member 220 in the annular groove 211 formed on the outer periphery of the stationary ring 210, the plurality of divided bodies 210A and 210B are positioned relative to each other in the axial direction. The same applies to the rotary ring unit 300.

Then, when the plurality of divided bodies are in the state in which they are positioned relative to each other in the axial direction by the annular member, by clamping the outer peripheral surfaces of the plurality of divided bodies by the metallic band, the plurality of divided bodies are fixed. That is, in the stationary ring unit 200, when the plurality of divided bodies 210A and 210B are in the state in which they are positioned relative to each other in the axial direction by the annular member 220, by clamping the outer peripheral surfaces of the plurality of divided bodies 210A and 210B with the metallic band, the plurality of divided bodies 210A and 210B are fixed. The same applies to the rotary ring unit 300.

With the foregoing, it becomes possible to perform the positioning of the plurality of divided bodies in the axial direction and the positioning of the plurality of divided bodies in a radial direction with improved accuracy.

In addition, in the present example, there is also an advantage that, since it is only necessary to perform the fixing with the hose band when the plurality of divided bodies are in a state where they are fixed preliminarily, the assembling operation is easy.

Further, in the present example, there is also an advantage that, since the seal ring is divided into two freely, the divided surfaces gear with each other and hence they do not slide easily.

Note that it is preferable that the divided surfaces of the divided bodies 210A and 210B composing the stationary ring 210 and the divided surfaces of the divided bodies 220A and 220B composing the annular member 220 are displaced from each other (e.g., displaced by 90 degrees) (see FIG. 1). The same applies to the rotary ring 310.

Furthermore, in the present example, a portion of each of the fixing members (the hose band 230, 330) is configured to wind around the outer peripheral side of each of the annular members 220 and 230 (see FIG. 2). Accordingly, it is possible to prevent the annular members 220 and 230 from being released by some influence.

Note that, as described above, the present example is configured such that the clamping forces from the metallic bands 231 and 331 of the hose bands 230 and 330 do not act on the annular members 220 and 320.

Further, in the present example, the stationary ring 210, the annular member 220, and the hose band 230 that constitute the stationary ring unit 200, and the rotary ring 310, the annular member 320, and the hose band 330 that constitute the rotary ring unit 300 are composed of the same components, respectively. Accordingly, it is possible to reduce the total cost of the mechanical seal 100.

In addition, in the present example, on the annular member 220, the spring holes 222 are formed to which the springs 240 for urging the stationary ring 210 in the axial direction are attached. Accordingly, it is possible to provide the function for positioning the plurality of divided bodies 210A and 210B in the axial direction and the function for supporting the springs 240 to the annular member 220. Accordingly, it is possible to suppress an increase in the number of components.

Second Example

Figure 5:
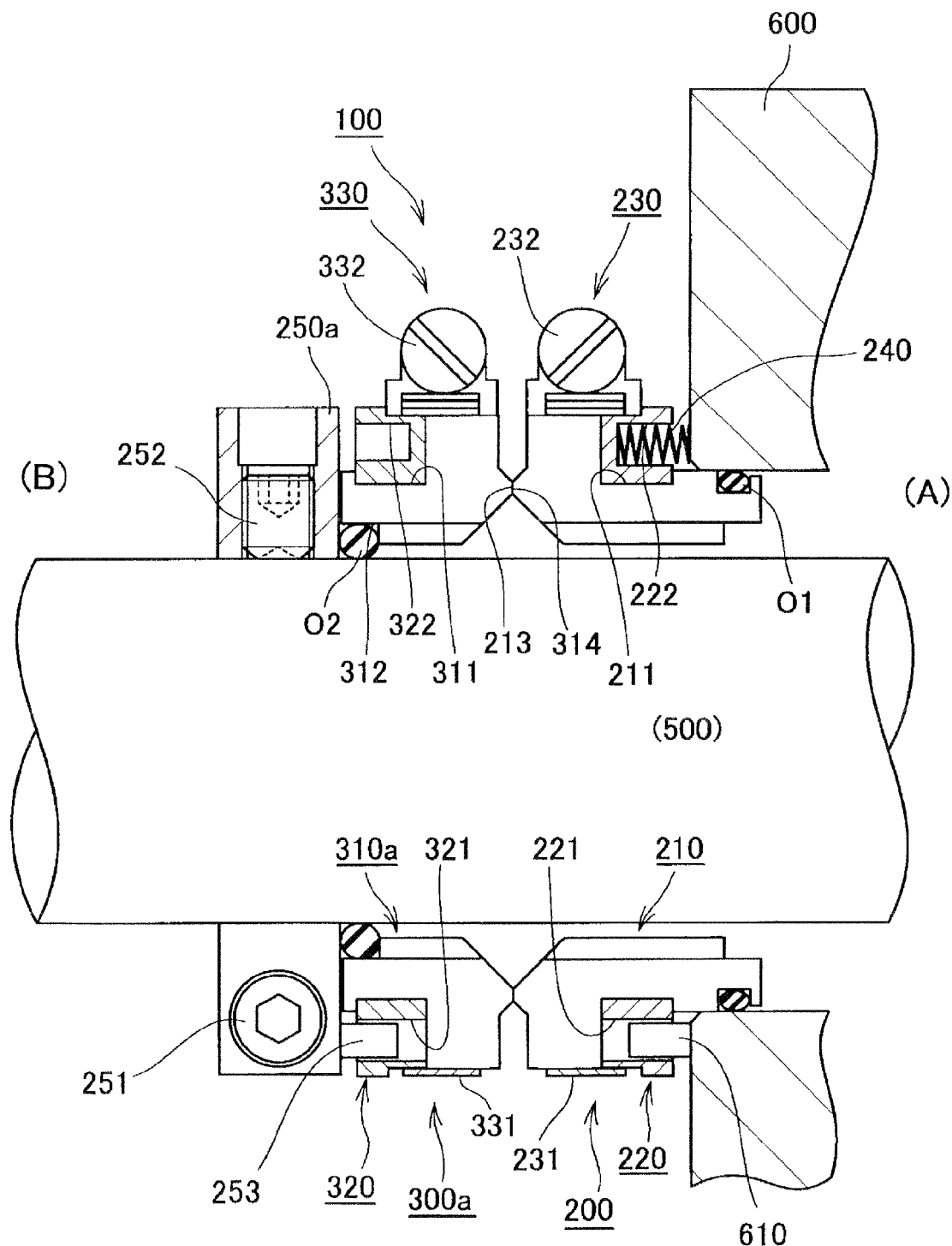
FIG. 5 is a schematic cross-sectional view showing a mounted state of a mechanical seal according to a second example of the present invention.

FIG. 5 shows a second example of the present invention. In the above first example, the case where the stationary ring and the rotary ring are composed of the same components has been described. In contrast, in the present example, a case where, in order to make the mechanical seal compact, the stationary ring and the rotary ring are composed of different components will be described. As other basic configurations and operations are the same as those of the first example, the same constituent part is designated by the same reference numeral and the description thereof will be omitted.

In the mechanical seal 100 according to the present example, the configuration of a rotary ring 310a as the seal ring constituting a rotary ring unit 300a is different from the configuration of the rotary ring 310 of the first example described above. That is, unlike the rotary ring 310 in the first example, in order to reduce the dimension in the axial direction, the rotary ring 310a according to the present example is configured such that its end portion on the opposite side of the seal end surface 314 is cut by cutting work. Consequently, in the case of the present example, the O ring O3 is not provided. In addition, along with this, the configuration of a collar 250a employs a structure that is simpler than that of the collar 250 in the first example.

In the mechanical seal 100 according to the present example configured as above, it is possible to obtain the same effects as those in the case of the above first example as well. In addition, in the case of the present example, it is possible to reduce the length of the rotary ring 310a in the axial direction, and hence it is possible to reduce the length of the entire mechanical seal 100 in the axial direction, as compared with the case of the first example.

Third Example

Figure 6:
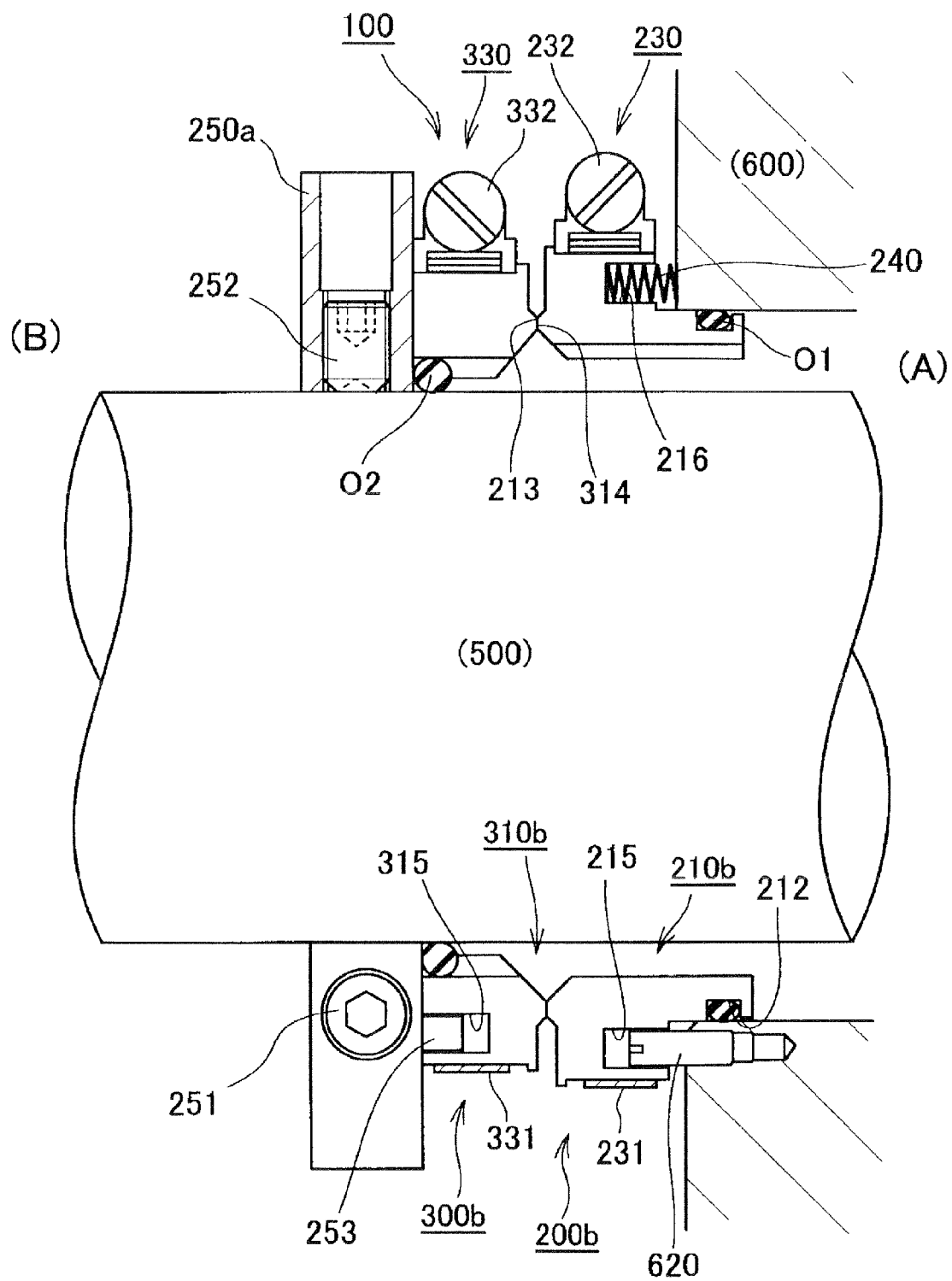
FIG. 6 is a schematic cross-sectional view showing a mounted state of a mechanical seal according to a third example of the present invention.

FIG. 6 shows a third example of the present invention. In each of the above first and second examples, the configuration in which the annular member is provided in order to perform the positioning of the plurality of divided bodies relative to each other in the axial direction has been described. In contrast, in the present example, a case where the annular member is not provided, in order to make the mechanical seal compact, will be described. Note that the same configurations as those in the above first and second examples are designated by the same reference numerals and the description thereof will be omitted as appropriate.

Similarly to the above examples, the mechanical seal 100 according to the present example is also an outside seal that includes a stationary ring unit 200b and a rotary ring unit 300b, and plays a role to seal the annular gap between the rotary shaft 500 and the housing 600.

Similarly to the above examples, the stationary ring unit 200b according to the present example also includes a stationary ring 210b as the annular seal ring. Similarly to the above examples, the stationary ring 210b is composed of the plurality of divided bodies. For example, as described in the first example, it is possible to configure the stationary ring 210b by two divided bodies obtained by freely dividing the seal ring into two. In addition, similarly to the above examples, the hose band 230 for fixing the plurality of divided bodies is provided. However, unlike the above examples, in the case of the present example, the annular member that performs the positioning of the plurality of divided bodies relative to each other in the axial direction is not provided. In addition, along with this, the annular groove for fitting the annular member is not provided on the outer periphery of the stationary ring 210b.

Similarly to the above examples, the stationary ring unit 200b according to the present example is mounted to the housing 600. In the case of the present example, a pin 620 as a detent portion attached to the end surface of the housing 600 is inserted (engaged with) into an attachment hole 215 as an engaged portion provided on the stationary ring 210b itself. Accordingly, the stationary ring unit 200b is mounted to the housing 600. Note that the annular groove 212 is formed on the outer peripheral side of the stationary ring 210b. By fitting the O ring O1 in the annular groove 212, an annular gap between the inner peripheral surface of the housing 600 and the outer peripheral surface of the stationary ring 210b is sealed.

In addition, in the case of the present example, on the stationary ring 210b itself, a plurality of spring holes 216 are provided to which the springs 240 are attached, and to each of the plurality of spring holes 216, the spring 240 is attached. Accordingly, the stationary ring unit 200b is urged towards the rotary ring unit 300b side. That is, with respect to the housing 600, the stationary ring unit 200b is constrained so as not to move in the rotation direction, but is configured to be movable in the axial direction.

The rotary ring unit 300b also includes a rotary ring 310b as the annular seal ring. Similarly to the above examples, the rotary ring 310b is composed of the plurality of divided bodies. In addition, similarly to the above examples, the hose band 330 for fixing the plurality of divided bodies is provided. However, unlike the above examples, in the case of the present example, the annular member that performs the positioning of the plurality of divided bodies relative to each other in the axial direction is not provided. In addition, along with this, the annular groove for fitting the annular member is not provided on the outer periphery of the rotary ring 310b.

The rotary ring unit 300b configured as above is mounted to the rotary shaft 500. That is, the pin 253 as the detent portion attached to the collar 250a fixed to the rotary shaft 500 is inserted into (engaged with) an attachment hole 315 as the engaged portion provided on the rotary ring 310b itself. Accordingly, the rotary ring unit 300b is mounted to the rotary shaft 500. That is, the rotary ring unit 300b is constrained by the pin 253 so as not to move in the rotation direction with respect to the collar 250a.

In addition, as described above, since the stationary ring unit 200b is urged towards the rotary ring unit 300b side by the plurality of springs 240, the seal end surface 213 of the stationary ring 210b and the seal end surface 314 of the rotary ring 310b will not be spaced apart.

In the mechanical seal 100 configured as above, the rotary ring unit 300b rotates with the rotation of the rotary shaft 500, and the seal end surface 314 of the rotary ring 310b and the seal end surface 213 of the stationary ring 210b slide against each other while making intimate contact with each other, as well. Therefore, it is possible to prevent the leakage of the sealed liquid to the outer peripheral side (B).

The configuration of the seal ring will be described in greater detail. As described above, similarly to the above examples, the seal rings (the stationary ring 210b and the rotary ring 310b) that constitute the mechanical seal 100 of the present example have, with the objective of mountability (necessity), a two-piece structure in which an annularly-shaped member is formed by combining two divided bodies. That is, the mechanical seal 100 according to the present example also adopts a divided-type seal ring that is an annular seal ring composed by combining a plurality of divided bodies. The stationary ring unit 200b and the rotary ring unit 300b have the same basic configuration. Accordingly, in the following description, only the constituent components on the stationary ring unit 200b side will be described in detail in order to make the description simple.

The stationary ring 210b is formed of ceramics (plastic material) such as SiC or alumina. The stationary ring 210b is composed of two divided bodies obtained by dividing an annular member by, for example, pulling. When assembling the stationary ring unit 200b, after forming the annular stationary ring 210b by combining the two bodies, the outer peripheral surfaces of the two divided bodies are clamped by the metallic band 231 of the hose band 230. Accordingly, the two divided bodies are fixed. Note that, by clamping the outer peripheral surface of the stationary ring 210b composed of the two divided bodies with the metallic band 231 by tightening the clamp bolt 232 on the hose band 230, it is possible to clamp the outer peripheral surface of the stationary ring 210b over its entire circumference with a substantially uniform clamping force. Note that the assembly of the rotary ring unit 300b is the same as the assembly of the stationary ring unit 200b.

In the mechanical seal 100 according to the present example configured as above, the plurality of divided bodies are fixed by clamping the outer peripheral surfaces of the plurality of divided bodies with the metallic band, as well. Thus, as compared with a structure in which the plurality of divided bodies are fixed by a clamping ring, it becomes possible to simplify the structure and reduce the size of the structure. In addition, there is also an advantage that, by fixing with the metallic bands 231 and 331, it is possible to clamp the outer peripheral surface of the stationary ring 210b and the outer peripheral surface of the rotary ring 310b over the entire circumferences with a substantially uniform clamping force. Consequently, sealing performance is enhanced.

In addition, in the present example, on the stationary ring 210b itself, the spring holes 216 are formed to which the springs 240 are attached. Accordingly, as compared with the case where the spring hole is provided on the clamping ring in the conventional structure in which the plurality of divided bodies are fixed by the clamping ring, it is possible to reduce the size of the structure.

Further, in the present example, the attachment hole 315 as the engaged portion engaged by the pin 253 provided on the rotary shaft 500 side (more specifically, on the collar 250a fixed to the rotary shaft 500) is provided on the rotary ring 310b. In addition, the attachment hole 215 as the engaged portion engaged by the pin 620 provided on the housing 600 side is provided on the stationary ring 210b. Accordingly, as compared with the case where the engaged portion is provided on the clamping ring in the conventional structure in which the plurality of divided bodies are fixed by the clamping ring, it is possible to reduce the size of the structure.

Others

In each of the above examples, those cases where the seal ring (the stationary ring, the rotary ring) is composed of two divided bodies have been described. However, the present invention can also be applied to a case where the seal ring is composed of three or more divided bodies.

REFERENCE SIGNS LIST

100: mechanical seal, 200, 200b: stationary ring unit, 210, 210b: stationary ring, 210A, 210B: divided body, 211: annular groove, 212: annular groove, 213: seal end surface, 215: attachment hole, 216: spring hole, 220: annular member, 220A, 220B: divided body, 221: through hole, 222: spring hole, 223: bolt, 230: hose band, 231: metallic band, 232: bolt, 240: spring, 250, 250a: collar, 251: bolt, 252: set screw, 253: pin, 300, 300a, 300b: rotary ring unit, 310, 310a: rotary ring, 311: annular groove, 312: stepped portion, 313: annular groove, 314: seal end surface, 315: attachment hole, 320: annular member, 321: through hole, 322: spring hole, 330: hose band, 331: metallic band, 332: bolt, 500: rotary shaft, 600: housing, 610: pin, O1, O2, O3: O ring

The invention claimed is:

1. A mechanical seal that is an annular seal for sealing an annular gap between a rotary shaft and a housing, the mechanical seal comprising:
   a divided-type seal ring that is composed of a plurality of divided bodies comprising an annular groove formed on outer peripheral surfaces of the divided bodies;
   an annular member that is configured to position the plurality of divided bodies relative to each other in an axial direction by being fitted in the annular groove; and
   a metallic band that is disposed radially outside of the annular member and is configured to combine and fix the plurality of divided bodies to one another by clamping and acting on only the outer peripheral surfaces of the plurality of divided bodies in a state in which the plurality of divided bodies are positioned relative to each other in the axial direction by the annular member to form the annular seal.

2. The mechanical seal according to claim 1, wherein on the seal ring, a spring hole is formed to which a spring that urges the seal ring in an axial direction is inserted.

3. The mechanical seal according to claim 1, wherein the mechanical seal further comprises a detent portion provided on a rotary shaft or a housing side thereof, on the seal ring, an engaged portion is formed that is engaged by the detent portion.

4. The mechanical seal according to claim 3, wherein on the annular member, a spring hole is formed to which a spring that urges the seal ring in the axial direction is inserted.

5. The mechanical seal according to claim 1, wherein the annular member comprises a plurality of divided bodies that are configured to be combined and fixed together such that an entire circumference of the annular member is formed and fitted in the annular groove.

6. The mechanical seal according to claim 5, wherein an interface of the plurality of divided bodies of the annular member are displaced at a relative position circumferentially different from an interface of the plurality of divided bodies of the seal ring.

7. The mechanical seal according to claim 6, wherein the interface of the plurality of divided bodies of the annular member are displaced at a relative position circumferentially different by 90 degrees from the interface of the plurality of divided bodies of the seal ring.

* * * * *